United States Patent
Larsson et al.

(10) Patent No.: US 9,409,560 B2
(45) Date of Patent: Aug. 9, 2016

(54) ENHANCED DRIVABILITY FOR A HYBRID VEHICLE IN COLD CLIMATE

(71) Applicant: VOLVO CAR CORPORATION, Gothenburg (SE)

(72) Inventors: Daniel Larsson, Gothenburg (SE); Victor Hofmeijer, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 394 days.

(21) Appl. No.: 14/175,104

(22) Filed: Feb. 7, 2014

(65) Prior Publication Data

US 2014/0229091 A1 Aug. 14, 2014

(30) Foreign Application Priority Data

Feb. 14, 2013 (EP) ..................................... 13000774

(51) Int. Cl.
*F02N 11/08* (2006.01)
*B60W 10/06* (2006.01)
(Continued)

(52) U.S. Cl.
CPC ............. *B60W 10/06* (2013.01); *B60W 20/40* (2013.01); *F02D 41/068* (2013.01); *F02N 11/0829* (2013.01); *F02N 11/0833* (2013.01); *F02N 11/0837* (2013.01); *F02D 2200/0414* (2013.01); *F02D 2200/0606* (2013.01); *F02D 2200/0608* (2013.01); *F02D 2200/501* (2013.01); *F02N 2200/02* (2013.01); *F02N 2200/0801* (2013.01); *F02N 2200/122* (2013.01); *Y02T 10/48* (2013.01); *Y10S 903/905* (2013.01)

(58) Field of Classification Search
CPC . F02N 11/08; F02N 11/0803; F02N 11/0814; F02N 11/0818; F02N 11/0825; F02N 11/0829; F02N 11/0833; F02N 11/0837; F02N 2200/0801

USPC .............................. 123/179.3, 179.4; 701/113
See application file for complete search history.

(56) References Cited

U.S. PATENT DOCUMENTS 6,351,703 B1 * 2/2002 Avery, Jr. ................ B60R 25/04 123/179.2
7,027,912 B1 4/2006 Metzger
(Continued)

FOREIGN PATENT DOCUMENTS

DE 102009028326 2/2011
GB 2454349 5/2009

OTHER PUBLICATIONS

Extended European Search Report for EP 13000774.3, Completed by the European Patent Office on Jul. 25, 2013, 4 Pages.

*Primary Examiner* — Thomas Moulis
(74) *Attorney, Agent, or Firm* — Brooks Kushman P.C.

(57) ABSTRACT

A diesel fuel control system is provided for a hybrid electric vehicle. The system may include a control unit and an ambient air temperature sensor connected to the control unit. The control unit may be arranged to store information about a cold filter plugging point temperature of fuel. The system may include a connection from a velocity sensor of the vehicle to the control unit and a connection from a diesel temperature sensor. The control unit may be arranged to calculate the temperature of fuel in a fuel filter based on information from the temperature sensors and the velocity sensor, and may be arranged in connection with an engine control unit such that an internal combustion engine is arranged to start if the calculated temperature of the fuel is below the cold filter plugging point.

20 Claims, 1 Drawing Sheet

(51) Int. Cl.
  *B60W 20/00* (2016.01)
  *F02D 41/06* (2006.01)

(56) References Cited

U.S. PATENT DOCUMENTS

| | | | | |
|---|---|---|---|---|
| 7,610,143 | B1 * | 10/2009 | Boesch | B60K 6/365 |
| | | | | 701/112 |
| 8,370,010 | B2 * | 2/2013 | Imamura | B60K 6/445 |
| | | | | 180/65.28 |
| 9,051,906 | B2 * | 6/2015 | Armesto | F02M 37/22 |
| 2007/0283929 | A1 * | 12/2007 | Funabashi | F02D 33/006 |
| | | | | 123/446 |
| 2012/0125278 | A1 | 5/2012 | Ries-Mueller | |
| 2014/0045655 | A1 * | 2/2014 | Goh | B60W 10/04 |
| | | | | 477/184 |
| 2014/0251280 | A1 * | 9/2014 | Ikoma | F02D 41/042 |
| | | | | 123/478 |
| 2015/0120110 | A1 * | 4/2015 | Yang | B60W 20/16 |
| | | | | 701/22 |
| 2015/0226147 | A1 * | 8/2015 | Hirabayashi | F02D 41/403 |
| | | | | 701/103 |

* cited by examiner

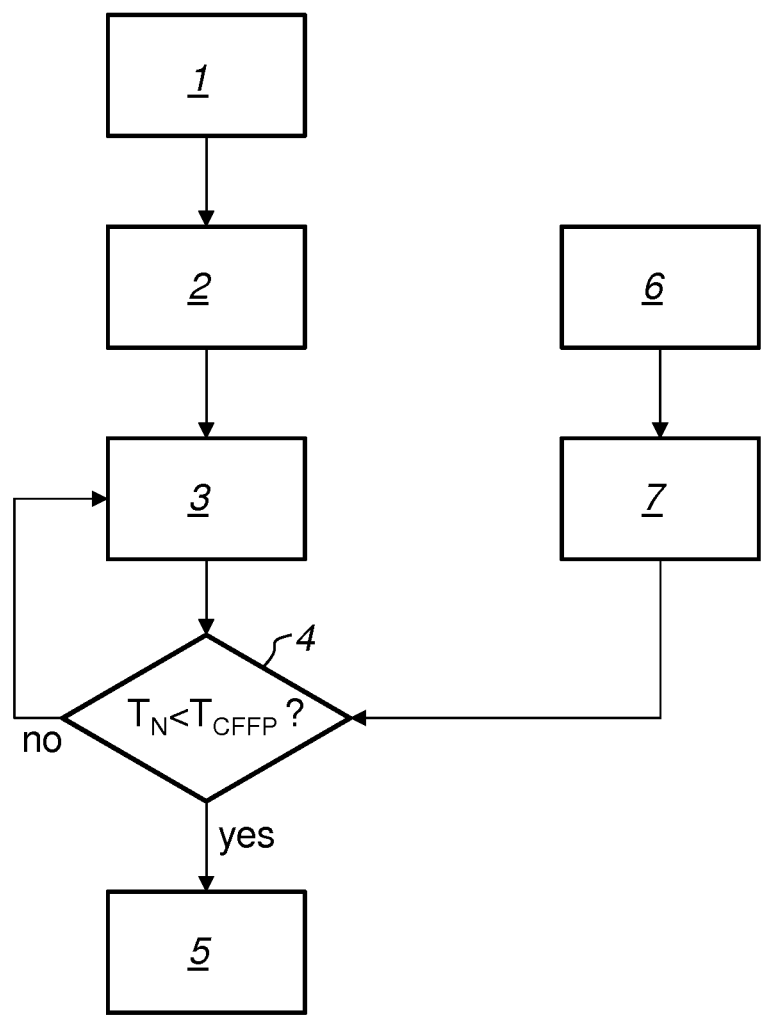

ENHANCED DRIVABILITY FOR A HYBRID VEHICLE IN COLD CLIMATE

CROSS-REFERENCE TO RELATED APPLICATIONS

This application claims foreign priority benefits under 35 U.S.C. §119(a)-(d) to European patent application number EP 13000774.3 filed Feb. 14, 2013, which is incorporated herein by reference in its entirety.

TECHNICAL FIELD

The present disclosure relates to a diesel fuel control system for a hybrid electric vehicle comprising, a control unit and an ambient air temperature sensor connected to said control unit, wherein said control unit is arranged to store information about the cold filter plugging point temperature.

BACKGROUND

In cold weather diesel engines are sometimes associated with starting problems, sluggish diesel fuel, i.e. diesel with high viscosity, and the necessity to use anti-gel additives. In other words, the biggest problem with running diesels in cold weather is the tendency of the fuel to gel. A type of diesel recommended for most passenger vehicles contains some naturally occurring paraffin (wax) and as the temperature drops, this paraffin crystallizes and affects the fluidity of the fuel and may cause hard starting and eventually lead to filter plugging/clogging. Unfortunately, this problem is exacerbated when biodiesel enters the equation—biodiesel tends to gel at a slightly higher temperature than diesel.

Luckily these problems are fairly easily solved. Regular diesel fuel is "winterized" or seasonally adjusted at the distributor before it's delivered to the pumps. Winterizing is done by mixing the type of diesel mentioned above with a more refined diesel. Winterizing diesel fuel is done to maintain the cold weather flow characteristics, and the ratios vary depending upon regional distribution. To effectively use biodiesel in cold climates, it must be mixed with winterized diesel in varying percentages, which, once again, are regionally dependent.

For hybrid vehicles with a diesel engine as the ICE (internal combustion engine) and especially for plug-in hybrids there enters a further problem. When the hybrid vehicle is driven solely by the electric motor the fuel will not even be flowing which might lead to the diesel getting colder. Therefore, to make sure that there is no clogging of the filter the ICE is always run if the ambient air drops below a predetermined temperature, for instance, 0° C. Even though some diesel fuels are "winterized", to be on the safe side, the ICE will be running and thereby the vehicle will more or less function as a standard vehicle without an electric motor at low temperatures.

A further problem arises with a plug in hybrid vehicle that is possible to run purely in electric mode for a long time, i.e. if for instance someone has a short commuting distance and recharge the battery every night or during the day when at work. In a worst case scenario such a vehicle still have diesel in the tank from the summer season when winter arrives.

SUMMARY

The object of the present disclosure is to provide system and method such that it is possible to run a hybrid electric vehicle in electric mode when it is cold outdoors.

This object is achieved by system and method as set forth in the appended claims.

According to the present disclosure a diesel fuel control system for a hybrid electric vehicle comprises a control unit and an ambient air temperature sensor connected to said control unit, wherein said control unit is arranged to store information about the cold filter plugging point temperature. The system further comprises a connection from the velocity sensor of the vehicle to the control unit and a connection from a diesel temperature sensor, wherein the control unit is arranged to calculate the temperature of the fuel in a fuel filter based on the information from said temperature sensors and said velocity sensor, and arranged in connection with an engine control unit such that the internal combustion engine is arranged to start if said calculated temperature is below the cold filter plugging point. Logically, the internal combustion engine of a diesel plug in hybrid electric vehicle would be running as soon as the ambient temperature gets below the cold filter plugging point temperature of summer fuel, i.e. below 0° C. for almost all countries and/or regions. With the present disclosure it is possible to run a vehicle in electric mode far below 0° C. However, since there might be errors in the calculation of the cold filter plugging point of the fuel, it could sometimes be advisable to have a safety margin, i.e. to have the internal combustion engine started a couple of degrees above the cold filter plugging point temperature.

According to a further aspect of the present disclosure the diesel temperature sensor is arranged in a high pressure pump. A benefit is that the high pressure pumps are easily equipped with temperature sensors and can be delivered equipped with sensors directly from the pump suppliers. Also, in most cases the temperature sensor is necessary to have for determining the coolant flow needed for the high pressure pump.

According to one aspect of the present disclosure said engine control unit is arranged to start the high pressure pump if the calculated temperature in the filter is more than 4-6 degrees below the cold filter plugging point. The internal combustion engine will start at the same time as the high pressure pump. This means that the filter initially may start to clog but because of the heat delivered by the high pressure fuel pump to the fuel, the temperature in the fuel filter will increase quickly and the paraffin or wax that has assembled in the filter will dissolve with the increased heat of the fuel. Alternatively, the control unit can be arranged to start the high pressure pump and thus the internal combustion engine if the calculated temperature is below the cold filter plugging point, i.e. it should be adapted for each specific layout of the vehicle driveline.

According to an aspect of the present disclosure the control unit is arranged to store time information regarding when fuel is filled. Especially for a plug in hybrid vehicle there is the possibility that it might be run in pure electric mode for a very long time, for instance when someone has just a couple of kilometers to work, it is possible to re-charge it every night and the internal combustion engine will not be started at all. In such a case there might be a tank full of "summer" diesel when it turns really cold, for some areas already in October (in the northern hemisphere). Therefore it is important to keep track of the time for time of fuelling the vehicle.

Further, when fuelling the vehicle, information on the amount of fuel added to the tank should be stored as well, i.e. by measuring and/or calculating.

According to another aspect of the present disclosure the control unit comprises a connection to the filler cap of the vehicle. When the vehicle is re-fuelled, the system calculates a new cold filter plugging point temperature based on the amount of fuel in the tank prior to re-fuelling and the time for the latest calculation of the cold filter plugging point temperature as well as the amount of fuel of the re-fuelling. Thus, when the filler cap is opened the system is on standby for calculating a new cold filter plugging point temperature. The calculations could for instance be initiated by the closing of the filler cap. For measuring the amount of fuel filled and already in the tank some kind of fuel level sensor is necessary. An alternative could for instance be that the calculation is started when the fuel filler door is open and the level sender indicates that there has been a change in fuel volume.

According to one aspect of the present disclosure the temperature of the oil in the internal combustion engine is measured, thus the control unit is connected to the internal combustion engine oil temperature sensor.

According to a further aspect of the present disclosure the control unit is connected to a positioning system. Traditionally, the vehicles are programmed according to the cold filter plugging point temperature of the fuel of the country in which they are sold. However, for better functionality the control unit is connected to a positioning system such as a GPS, RDS, or the mobile network that will give the location of where the vehicle is fuelled. As said before, it is important to keep track of the time when the vehicle is fuelled since the summer and winter quality of the diesel, i.e. the cold filter plugging point temperature, differ substantially in some countries. Also, the quality of summer (or winter) fuel may vary in neighbouring countries. Thus, fuelling in a different country than that in which the vehicle is sold will not matter with this solution using a positioning system. Thus, the system is adapted to the climate zones and seasons. For instance, at the moment in Europe the standard is EN590.

BRIEF DESCRIPTION OF THE DRAWINGS

The disclosure will now be further described with reference to the accompanying drawings.

FIG. 1 shows a simplified flow chart describing the principles of the present disclosure.

DETAILED DESCRIPTION

As required, detailed embodiments of the present disclosure are described herein. However, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

FIG. 1 shows a flow chart starting with the situation where the internal combustion engine is switched off 1. From there on the low pressure fuel pump is started 2 for having a flow through the high pressure fuel pump where there is a temperature sensor. After the temperature in the high pressure pump is measured the temperature in the fuel filter is calculated 3. The calculation of the temperature in the fuel filter is carried out with input data from the temperature of the high pressure fuel pump, the ambient air temperature, the temperature of the oil in the internal combustion engine, and the velocity of the vehicle.

In step 4 of the flow chart in FIG. 1 a comparison is made between the calculated temperature $T_N$ in the fuel filter and the critical cold filter plugging point temperature $T_{CFPP}$. If the calculated temperature is still above the critical cold filter plugging point temperature the system loops back to make a new calculation 3 of the temperature in the fuel filter. This continues until the calculated temperature in the fuel filter falls below the critical cold filter plugging point temperature in which case the system proceeds to step 5 with starting of the internal combustion engine to increase the temperature of the fuel.

The critical cold filter plugging point temperature is chosen such that the rate in the increase in temperature of the fuel is sufficient to prevent the filter from clogging. Thus, the filter actually starts clogging but when the internal combustion engine is started, the high pressure fuel pump which is started simultaneously heats the fuel fast enough for avoiding that the filter is totally clogged. This critical temperature is dependant of the physical properties of the filter, however, in the embodiments tested in developing this system the critical temperature is about 5 to 6 degrees (centigrade) below the cold filter plugging point. It should be noted that this might vary with another type of filter and especially if the filter would somehow be placed in a position where it is not cooled down as much by convection resulting from the ambient temperature and the velocity of the vehicle.

Further, it is sometimes preferred to have a safety margin of about 2 degrees (centigrade), i.e. such that the internal combustion engine is started when the calculated fuel temperature is 2 degrees or less above the cold filter plugging point temperature.

The cold filter plugging point is calculated when the vehicle is fuelled 6. The calculation 7 of the cold filter plugging point considers the added fuel volume, initial volume, added fuel quality and initial fuel quality for calculating a new average fuel quality, i.e. the cold filter plugging point. The fuel quality could be acquired from a database where the specific quality is dependant of the time of fuelling, i.e. if it is summer or winter. A further step is to use a positioning system, for instance a GPS, to get the specific quality data. Thus, the GPS tells which country's data should be used and the time if it is winter or summer.

Those skilled in the art will appreciate that the control unit and/or the engine control unit described above may refer to any combination of analog and/or digital circuitry, which may include one or more microprocessors, including memory, having stored software and/or firmware that when executed control and/or perform one or more of the functions and/or operations described herein. Such a control unit and/or engine control unit, including any processors and/or other digital hardware or circuitry, may be included in an ASIC (Application-Specific Integrated Circuit) or may be distributed among several separate components, whether individually packaged or assembled into a SoC (System-on-a-Chip).

The foregoing is a description of an example practicing the present disclosure. However, it is apparent that method incorporating modifications and variations will be obvious to one skilled in the art. Inasmuch as the foregoing description is intended to enable one skilled in the art to practice the instant disclosure, it should not be construed to be limited thereby, but should be construed to include such modifications and variations as fall within the scope of the claims. A further option to the system could be to have a time limit or a sort of best before date for the fuel. For example, when the fuel in the tank is 90 days or more old, the quality of the fuel in the calculation could be changed to have a higher cold filter plugging point temperature corresponding to "summer fuel." This will ensure an exchange rate of the fuel in the tank. Also, in the description and in the claims there is referred to a filler cap for providing a signal when the vehicle is being refuelled. There are of course several ways in which this could be done, for instance, when the button to the fuel filler door is pushed, the fuel filler door is opened, and a sensor in the fuel filler neck for recognizing a fuel nozzle.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A diesel fuel control system for a hybrid electric vehicle comprising:
   a control unit arranged to store information about a cold filter plugging point temperature of fuel in the vehicle;
   an ambient air temperature sensor connected to said control unit;
   a connection from a velocity sensor of the vehicle to the control unit; and
   a connection from a fuel temperature sensor to the control unit;
   wherein the control unit is arranged to calculate a temperature of fuel in a fuel filter based on information from the temperature sensors and the velocity sensor, and arranged in connection with an engine control unit such that an internal combustion engine is arranged to start if the calculated temperature of the fuel is below the cold filter plugging point.

2. A diesel fuel delivery system according to claim 1, wherein said fuel temperature sensor is arranged in a high pressure fuel pump.

3. A diesel fuel delivery system according to claim 2, wherein said engine control unit is arranged to start the high pressure pump if the calculated temperature in the filter is more than 4 to 6 degrees below the cold filter plugging point.

4. A diesel fuel delivery system according claim 1, wherein the control unit is arranged to store time information regarding when fuel is filled.

5. A diesel fuel delivery system according to claim 1, wherein the control unit comprises a connection to a filler cap of the vehicle.

6. A diesel fuel delivery system according to claim 1, wherein the control unit is connected to a positioning system.

7. A diesel fuel delivery system according to claim 2 further comprising a connection to a low pressure fuel pump arranged to pump the fuel through the high pressure pump at least a part of the time when the high pressure pump is not operating.

8. A diesel fuel delivery system according to claim 1, wherein the control unit is connected to an internal combustion engine oil temperature sensor.

9. A method for running a diesel hybrid electric vehicle in electric mode in cold weather, wherein the vehicle comprises a control unit connected to an ambient temperature sensor, to a fuel temperature sensor, and to a velocity sensor of the vehicle, the method comprising:
   measuring an ambient temperature;
   retrieving information from the control unit on a cold filter plugging point temperature of fuel in the vehicle;
   measuring a temperature of diesel fuel;
   measuring a velocity of the vehicle;
   calculating a temperature in a fuel filter;
   starting the internal combustion engine if the calculated temperature in the fuel filter is 4 to 6 degrees or more below the cold filter plugging point temperature; and
   switching off the internal combustion engine when the calculated temperature in the fuel filter has increased to the cold filter plugging point temperature.

10. A method according to claim 9, wherein the control unit further is connected to a sensor in the filler cap and a calendar, such that the control unit calculates the cold filter plugging point temperature based on when the fuel tank is filled, the amount of fuel filled, the amount of fuel already in the tank and the cold filter plugging point temperature of fuel in the tank prior to filling the tank.

11. A method according to claim 9, wherein the control unit is connected to a positioning system for determining the cold filter plugging point temperature of the fuel being filled in the vehicle tank.

12. A method according to claim 9, wherein a low pressure pump circulates fuel through a high pressure pump and the fuel filter when the vehicle is in electric mode.

13. A method according to claim 9, wherein a combustion engine oil temperature is measured and used as input data for calculating the temperature in the fuel filter.

14. A method for running a diesel hybrid electric vehicle in electric mode in cold weather, the method comprising:
   measuring an ambient temperature;
   measuring a temperature of diesel fuel;
   measuring a velocity of the vehicle;
   determining a temperature in a fuel filter based on the measured ambient temperature, the measured diesel fuel temperature, and the measured velocity;
   starting the internal combustion engine if the temperature in the fuel filter is 4 to 6 degrees or more below a cold filter plugging point temperature of fuel in the vehicle; and
   switching off the internal combustion engine when the temperature in the fuel filter has increased to the cold filter plugging point temperature.

15. A diesel fuel control system for a hybrid electric vehicle comprising:
   a control unit arranged to store information about a cold filter plugging point temperature of fuel in the vehicle; and
   wherein the control unit is arranged to calculate a temperature of fuel in a fuel filter based on information received from an ambient air temperature sensor, a fuel temperature sensor, and a velocity sensor of the vehicle, and wherein the control unit is arranged in connection with an engine control unit such that an internal combustion engine is arranged to start if the calculated temperature of the fuel is below the cold filter plugging point.

16. A diesel fuel delivery system according to claim 15, wherein the engine control unit is arranged to start a high pressure pump if the calculated temperature in the filter is more than 4 to 6 degrees below the cold filter plugging point.

17. A diesel fuel delivery system according claim 15, wherein the control unit is arranged to store time information regarding when fuel is filled.

18. A diesel fuel delivery system according to claim 15, wherein the control unit is connected to a filler cap of the vehicle.

19. A diesel fuel delivery system according to claim 15, wherein the control unit is connected to a positioning system.

20. A diesel fuel delivery system according to claim 15, wherein the control unit is connected to an internal combustion engine oil temperature sensor.

* * * * *